(12) United States Patent
Kalach et al.

(10) Patent No.: US 8,990,171 B2
(45) Date of Patent: Mar. 24, 2015

(54) OPTIMIZATION OF A PARTIALLY DEDUPLICATED FILE

(75) Inventors: Ran Kalach, Bellevue, WA (US); Kashif Hasan, Snoqualmie, WA (US); Paul Adrian Oltean, Redmond, WA (US); James Robert Benton, Seattle, WA (US); Chun Ho Cheung, Redmond, WA (US); Abhishek Gupta, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/223,484

(22) Filed: Sep. 1, 2011

(65) Prior Publication Data

US 2013/0060739 A1    Mar. 7, 2013

(51) Int. Cl.
*G06F 17/30*    (2006.01)

(52) U.S. Cl.
CPC .............................. *G06F 17/30159* (2013.01)
USPC ............................ 707/692; 707/664; 711/100

(58) Field of Classification Search
CPC .................... G06F 17/30156; G06F 17/30159; G06F 17/30489
USPC ........... 707/637, 692, 758, 957, 664; 711/100
See application file for complete search history.

(56) References Cited

U.S. PATENT DOCUMENTS

| | | | |
|---|---|---|---|
| 5,813,008 A | 9/1998 | Benson et al. | |
| 5,990,810 A | 11/1999 | Williams | |
| 6,389,433 B1 | 5/2002 | Bolosky et al. | |
| 6,477,544 B1 | 11/2002 | Bolosky et al. | |
| 6,993,520 B2 | 1/2006 | Doyle et al. | |
| 7,107,419 B1 | 9/2006 | Ghemawat et al. | |
| 7,222,119 B1 | 5/2007 | Ghemawat et al. | |
| 7,246,254 B2 | 7/2007 | Alur et al. | |
| 7,340,494 B1 | 3/2008 | Detiefs et al. | |
| 7,401,080 B2 | 7/2008 | Benton et al. | |

(Continued)

FOREIGN PATENT DOCUMENTS

| | | |
|---|---|---|
| CN | 1846265 | 10/2006 |
| CN | 101663654 | 3/2010 |

(Continued)

OTHER PUBLICATIONS

Chen et al., "Profile-Guided Proactive Garbage Collection for Locality Optimization", Proc. ACM SIGPLAN Conference on Programming Language Design andImplementation, Jun. 2006, 10 pages.

(Continued)

*Primary Examiner* — Robert Beausoliel, Jr.
*Assistant Examiner* — Alexandria Bromell
(74) *Attorney, Agent, or Firm* — Henry Gabryjelski; David Andrews; Micky Minhas (57) ABSTRACT

The subject disclosure is directed towards transforming a file having at least one undeduplicated portion into a fully deduplicated file. For each of the at least one undeduplicated portion, a deduplication mechanism defines at least one chunk between file offsets associated with the at least one undeduplicated portion. Chunk boundaries associated with the at least one chunk are stored within deduplication metadata. The deduplication mechanism aligns the at least one chunk with chunk boundaries of at least one deduplicated portion of the file. Then, the at least one chunk is committed to a chunk store.

20 Claims, 8 Drawing Sheets

(56) References Cited

U.S. PATENT DOCUMENTS

| | | | |
|---|---|---|---|
| 7,519,635 B1 | 4/2009 | Haustein et al. | |
| 7,567,188 B1 | 7/2009 | Anglin et al. | |
| 7,636,801 B1 | 12/2009 | Kekre et al. | |
| 7,685,182 B2 | 3/2010 | Dussud | |
| 7,739,312 B2 | 6/2010 | Gordon et al. | |
| 7,774,389 B2 | 8/2010 | Stephens et al. | |
| 7,814,074 B2 | 10/2010 | Anglin et al. | |
| 7,818,495 B2 | 10/2010 | Tanaka et al. | |
| 7,856,437 B2 | 12/2010 | Kirshenbaum | |
| 7,870,105 B2 | 1/2011 | Arakawa et al. | |
| 7,870,409 B2 | 1/2011 | Murase | |
| 7,899,796 B1* | 3/2011 | Borthwick et al. | 707/692 |
| 8,380,681 B2 | 2/2013 | Oltean et al. | |
| 8,447,740 B1 | 5/2013 | Huang et al. | |
| 8,566,291 B2* | 10/2013 | Auvenshine et al. | 707/692 |
| 8,645,335 B2 | 2/2014 | Gupta et al. | |
| 2002/0107877 A1 | 8/2002 | Whiting et al. | |
| 2002/0133491 A1 | 9/2002 | Sim et al. | |
| 2004/0059758 A1 | 3/2004 | Faiman et al. | |
| 2004/0068627 A1 | 4/2004 | Sechrest et al. | |
| 2006/0020474 A1 | 1/2006 | Stewart et al. | |
| 2006/0112251 A1 | 5/2006 | Karr et al. | |
| 2007/0226443 A1 | 9/2007 | Giampaolo | |
| 2007/0250552 A1 | 10/2007 | Lango et al. | |
| 2008/0005201 A1 | 1/2008 | Ting et al. | |
| 2008/0104107 A1 | 5/2008 | Schwaab et al. | |
| 2008/0120459 A1 | 5/2008 | Kaneda et al. | |
| 2008/0154985 A1 | 6/2008 | Childs et al. | |
| 2008/0155192 A1 | 6/2008 | Iitsuka | |
| 2008/0162611 A1 | 7/2008 | Wolczko et al. | |
| 2008/0244577 A1 | 10/2008 | Le et al. | |
| 2008/0270729 A1 | 10/2008 | Reddy et al. | |
| 2009/0037500 A1 | 2/2009 | Kirshenbaum | |
| 2009/0112952 A1 | 4/2009 | Adams et al. | |
| 2009/0190760 A1 | 7/2009 | Bojinov et al. | |
| 2009/0204650 A1 | 8/2009 | Wong et al. | |
| 2009/0216788 A1 | 8/2009 | Rao et al. | |
| 2009/0254609 A1 | 10/2009 | Wideman | |
| 2009/0265506 A1 | 10/2009 | Yim | |
| 2009/0271454 A1 | 10/2009 | Anglin et al. | |
| 2009/0300321 A1 | 12/2009 | Balachandran et al. | |
| 2009/0313248 A1 | 12/2009 | Balachandran et al. | |
| 2010/0036887 A1 | 2/2010 | Anglin et al. | |
| 2010/0042790 A1* | 2/2010 | Mondal et al. | 711/161 |
| 2010/0070478 A1 | 3/2010 | Anglin | |
| 2010/0070544 A1 | 3/2010 | Gopalan et al. | |
| 2010/0082558 A1 | 4/2010 | Anglin et al. | |
| 2010/0082672 A1 | 4/2010 | Kottomtharayil et al. | |
| 2010/0082700 A1 | 4/2010 | Parab | |
| 2010/0082930 A1 | 4/2010 | Jiva et al. | |
| 2010/0088277 A1 | 4/2010 | Rao et al. | |
| 2010/0088296 A1 | 4/2010 | Periyagaram et al. | |
| 2010/0088349 A1* | 4/2010 | Parab | 707/802 |
| 2010/0094817 A1 | 4/2010 | Ben-Shaul et al. | |
| 2010/0106691 A1 | 4/2010 | Preslan et al. | |
| 2010/0121825 A1 | 5/2010 | Bates et al. | |
| 2010/0161608 A1 | 6/2010 | Jain et al. | |
| 2010/0174881 A1 | 7/2010 | Anglin et al. | |
| 2010/0198792 A1 | 8/2010 | Camble et al. | |
| 2010/0199042 A1* | 8/2010 | Bates et al. | 711/114 |
| 2010/0199065 A1* | 8/2010 | Kaneda | 711/209 |
| 2010/0223441 A1 | 9/2010 | Lillibridge et al. | |
| 2010/0235332 A1 | 9/2010 | Haustein et al. | |
| 2010/0241654 A1* | 9/2010 | Wu et al. | 707/769 |
| 2010/0250501 A1* | 9/2010 | Mandagere et al. | 707/692 |
| 2010/0299311 A1 | 11/2010 | Anglin et al. | |
| 2010/0313036 A1 | 12/2010 | Lumb | |
| 2010/0332401 A1 | 12/2010 | Prahlad et al. | |
| 2010/0332479 A1* | 12/2010 | Prahlad et al. | 707/741 |
| 2010/0333116 A1* | 12/2010 | Prahlad et al. | 719/328 |
| 2011/0016095 A1 | 1/2011 | Anglin et al. | |
| 2011/0022718 A1* | 1/2011 | Evans et al. | 709/231 |
| 2011/0029739 A1 | 2/2011 | Nakajima et al. | |
| 2011/0071989 A1 | 3/2011 | Wilson et al. | |
| 2011/0099351 A1* | 4/2011 | Condict | 711/216 |
| 2011/0125722 A1 | 5/2011 | Rao et al. | |
| 2011/0138154 A1* | 6/2011 | Tevis et al. | 712/220 |
| 2011/0307447 A1* | 12/2011 | Sabaa et al. | 707/637 |
| 2011/0320865 A1 | 12/2011 | Jain et al. | |
| 2012/0016846 A1* | 1/2012 | Anglin | 707/692 |
| 2012/0130958 A1 | 5/2012 | Kalach et al. | |
| 2012/0131025 A1 | 5/2012 | Cheung et al. | |
| 2012/0151177 A1 | 6/2012 | Kalach et al. | |
| 2012/0158675 A1 | 6/2012 | Gupta et al. | |
| 2012/0159098 A1 | 6/2012 | Cheung et al. | |
| 2012/0233417 A1 | 9/2012 | Kalach et al. | |
| 2013/0036277 A1* | 2/2013 | Szczepkowski et al. | 711/159 |
| 2013/0060739 A1 | 3/2013 | Kalach et al. | |

FOREIGN PATENT DOCUMENTS

| | | |
|---|---|---|
| CN | 101710323 | 5/2010 |
| WO | 2010103569 | 9/2010 |

OTHER PUBLICATIONS

Joisha, Pramod G., "Compiler Optimizations for Nondeferred Reference-Counting Garbage Collection", 5th International Symposium on Memory Management, Jun. 2006, pp. 150-161.

"Reclaiming Space in a Backup Exec Deduplication Folder", Article ID: TECH 130103, Symantec, Jan. 17, 2010, 3 pages (Author unknown).

"Achieving Storage Efficiency with Data Deduplication", <http://www.dell.com/downloads/global/products/pvaul/en/nx4-dedup.pdf>, 2008, (Author unknown).

Clements et al., "Decentralized Deduplication in SAN Cluster File Systems", <http://www.scs.stanford.edu/~jinyuan/dede.pdf, Aug. 1, 2011, 14 pages.

Yang et al., "FBBM: A new Backup Method with Data De-duplication Capability", International Conference on Multimedia and Ubiquitous Engineering, http://ieee.explore.ieee.org/stamps/stamp.jsp?anumber=04505688>, Apr. 24-26, 2008, pp. 30-35.

"Transform Your Backup Through Data De-duplication", <http://www.busmanagement.com/article/Transform-Your-Backup-Through-Data-De-duplication/>, Jul. 7, 2010, 2 pages. (Author unknown).

Burgener, Eric, "Is data deduplication the best capacity optimisation tool?", <http://searchstorage.techtarget.com.au/articles/29797-Is-data-deduplication-the-best-capacity-optimisation-tool->, Feb. 26, 2009, 5 pages.

"Data Deduplication and its Benefits", <http://www.mindteck.com/whitepapers/Data-Deduplication-pdf>, Sep. 9, 2009, pp. 1-7, (Author unknown).

"Symantec Advocates Data Deduplication as Part of an Overall Backup Strategy", <http://www.symantec.com/about/news/releast/article.jsp?prid=20070501_01>, May 1, 2007, 2 pages, (Author unknown).

"How to use Duplic8", <https://web.archive.org/web/20080428202008/http://www.kewlit.com/duplic8/howtouse.html>, Apr. 28, 2008, 11 pages (Author unknown).

Yang et al., "DEBAR: A Scalable High-Performance De-duplication Storage System for Backup and Archieving", Apr. 23, 2010, 19 pages.

Raffo, Dave, "Permabit launches Alberio data deduplication for primary data reduction", Jun. 7, 2010, 4 pages.

"Permabit Alberio™ High-Performance Data Optimization Software", Sep. 2010, 2 pages (Author unknown).

"HP Store Once: reinventing data deduplication", 2010, (Author unknown).

International Search Report and Written Opinion received for PCT Patent Application No. PCT/US2011/065658, mailed Sep. 10, 2012, 8 pages.

Extended European Search Report received for European Patent Application No. 11847971.6, mailed Jul. 11, 2014, 5 pages.

Zhu et al., "Avoiding the Dick Bottleneck in the Data Domain Deduplication File System", Proceedings of the 6th USENIX Conference on File and Storage Technologies, Feb. 26, 2008, 14 pages.

Komiega, Kevin, "Quantum Adds Deduplication to StorNext Software", <http://www.infostor.com/index/articles/InfoStor-Article-Tool-Template/_saveArticle/Articles/infostor/storage-managment/

(56) References Cited

OTHER PUBLICATIONS data-de-duplication/2010/january-2010/quantu-adds_deduplication.html>, Jan. 2010, 2 pages.

Bhagwat, et al.,"Extreme Binning: Scalable, Parallel Deduplication for Chunk-based File Backup", IEEE International Symposium on Modeling, Analysis & Simulation of Computer and Telecommunication Systems, Sep. 21, 2009, 9 pages.

Correia, Edward J., "Quantum Adds Deduplication to NextStor 4.0", <http://www.networkcomputing.com/print_entry.php?eid=84606>, Jan. 22, 2010, 2 pages.

Carman, et al., "Towards and Economy-based Optimisation of File Access and Replication on a Data Grid", Proceedings of the 2nd IEEE/ACM International Symposium on Cluster Computing and the Grid, May 21, 2002, 6 pages.

Jin et al.,"The Effectiveness of Deduplication on Virtual Machine Disk Images" Proceedings of SYSTOR: The Israeli Experimental Systems Conference, May 4, 2009, 12 pages.

Soltesz, et al., "Container-Based Operating System Virtualization: A Scalable, High-Performance Alternative to Hypervisors", Proceedings of the 2nd ACM SIGOPS/EuroSys European Conference on Computer Systems, Mar. 21, 2007.

Rao, Goutham, "End to Dedup", <http://web.archieve.org/web/20101022110513/http://onlinestorageoptimization.com/index.php/tag/dedup-for-online/>, Oct. 14, 2009.

"Best Practices for Data Deduplication Technology in Disk-based Backup", <http://www.sencilo.com/blog/article/best-practices-for-data-deduplication-technology-in-disk-based-backup/> Sep. 9, 2009, (Author unknown).

Randal, Paul S., "Filestream Storage inSQL Server 2008", <http://msdn.microsoft.com/library/hh461480>, Oct. 2008.

"Introduction to Cisco WAAS", <http://www.cosco.com/c/en/us/td/docs/app_ntwk_services/waas/waas/v407/configuration/guide/cfgd/intro.html>, Oct. 13, 2010, (Author unknown).

Shastry et al., "How to Go Hand-in-hand with DB2 and Informix", <http://www.ibm.com/developerworks/data/library/techarticle/dm-0701shastry/>, Jan. 25, 2007.

* cited by examiner

OPTIMIZATION OF A PARTIALLY DEDUPLICATED FILE

CROSS REFERENCE TO RELATED APPLICATIONS

This application is related to U.S. patent application Ser. No. 12/970,839 entitled "EXTENSIBLE PIPELINE FOR DATA DEDUPLICATION," U.S. patent application Ser. No. 12/970,848 entitled "PARTIAL RECALL OF DEDUPLICATED FILES," and U.S. patent application Ser. No. 12/949,391 entitled "SCALABLE CHUNK STORE FOR DATA DEDUPLICATION."

BACKGROUND

Data deduplication (sometimes referred to as data optimization) refers to detecting, uniquely identifying and eliminating redundant data in storage systems and thereby reducing the physical amount of bytes of data that need to be stored on disk or transmitted across a network, without compromising the fidelity or integrity of the original data. By reducing the resources needed to store and/or transmit data, data deduplication thus leads to savings in hardware and power costs (for storage) and data management costs (e.g., reducing backup costs). As the amount of digitally stored data grows, these cost savings become significant.

Data deduplication typically uses a combination of techniques for eliminating redundancy within and between persistently stored files. One such technique operates to identify identical regions of data in one or multiple files, and physically store only one unique region (chunk), while maintaining a reference to that chunk in association with the file for all the repeated occurrences of this data. Another technique is to mix data deduplication with compression, e.g., by storing compressed chunks.

There are many difficulties, tradeoffs and choices with data deduplication, including that in some environments, there is too much data to deduplicate in one single operation given available time and resources. A specific challenge exists with files which are partially deduplicated, such as a previously deduplicated file that is partially recalled to disk in response to new data or a modification of existing data. Deduplicating the partially deduplicated file in its entirety requires a significant amount of input/output resources for reading and chunking the entire file and then, writing the chunks into the chunk store as well as CPU resources for performing the chunking and compression.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed to optimizing a partially deduplicated file by transforming a file having one or more undeduplicated portions into a fully deduplicated file. In one aspect, a deduplication mechanism performs a deduplication process on an undeduplicated portion by identifying one or more chunks that encompass the undeduplicated portion and defining one or more new chunks between file offsets associated with the one or more chunks. Chunk boundaries associated with the one or more new chunks do not overlap chunks of non-recalled deduplicated portions of the file. By maintaining an alignment with the non-recalled deduplicated portions, the one or more new chunks may be committed to a chunk store without modifying any other chunk. In another aspect, deduplication metadata associated with the file is modified to include the chunk boundaries and other information associated with the one or more new chunks and any metadata associated with the one or more chunks may be replaced.

In another aspect, the file may be partitioned into sub-file partitions to simplify the deduplication process. The deduplication mechanism chunks and commits a single sub-file partition at a time during each deduplication process. Then, the deduplication mechanism truncates this sub-file partition from the file before deduplicating a next sub-file partition. If the deduplication process is paused before completing the deduplication of a sub-file partition, the deduplication process may resume at a position after a last chunk that was committed.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards to optimizing a partially deduplicated file by transforming a file having one or more undeduplicated portions into a fully deduplicated file. In one exemplary implementation, the partially deduplicated file may include a partially recalled file that is optimized by deduplicating recalled file ranges instead of the entire file and combining deduplication metadata associated with previously deduplicated portions with the newly deduplicated file ranges. Because the previously deduplicated portions are not deduplicated again, significant capacities of I/O and CPU resources are saved. Similarly, a portion within the partially deduplicated file may be deduplicated such that new chunks within the portion align with the chunks of the surrounding previously deduplicated portions.

In another exemplary implementation, the deduplication mechanism optimizes a large file in stages by partitioning the file into sub-file partitions, committing chunks within each sub-file partition to chunk store and truncating the sub-file partition from a file stream comprising the file. Such an implementation frees up storage space before optimizing the entire file and reduces the possibility of a memory leak if there is a crash or abortion before the file is fully deduplicated.

In another exemplary implementation, the deduplication mechanism supports a pause instruction that suspends the deduplication process until a following resume instruction. The deduplication mechanism restarts the deduplication process at a first undeduplicated portion, which is a last portion that was not chunked and committed to the chunk store. This allows a main system to pause the deduplication process if system resources are needed for another workload without repeating the deduplication process on already deduplicated data.

In yet another exemplary implementation, fast input/output on a large file is enabled by a multi-level partitioning of chunks and corresponding file ranges. Because deduplication metadata that includes a large collection of the file ranges becomes difficult to search, partitioning of the file into a number of consecutive, smaller sub-file partitions, which are again partitioned, allows the deduplication mechanism to efficiently translate virtual file offsets (relative to the beginning of the file) into specific chunk offsets within those sub-file partitions. The file offset translation may be executed during input/output (I/O) activity (i.e., read/write) with the file. Adequate performance of this translation may be achieved with limited impact to the I/O activity.

Figure 1:
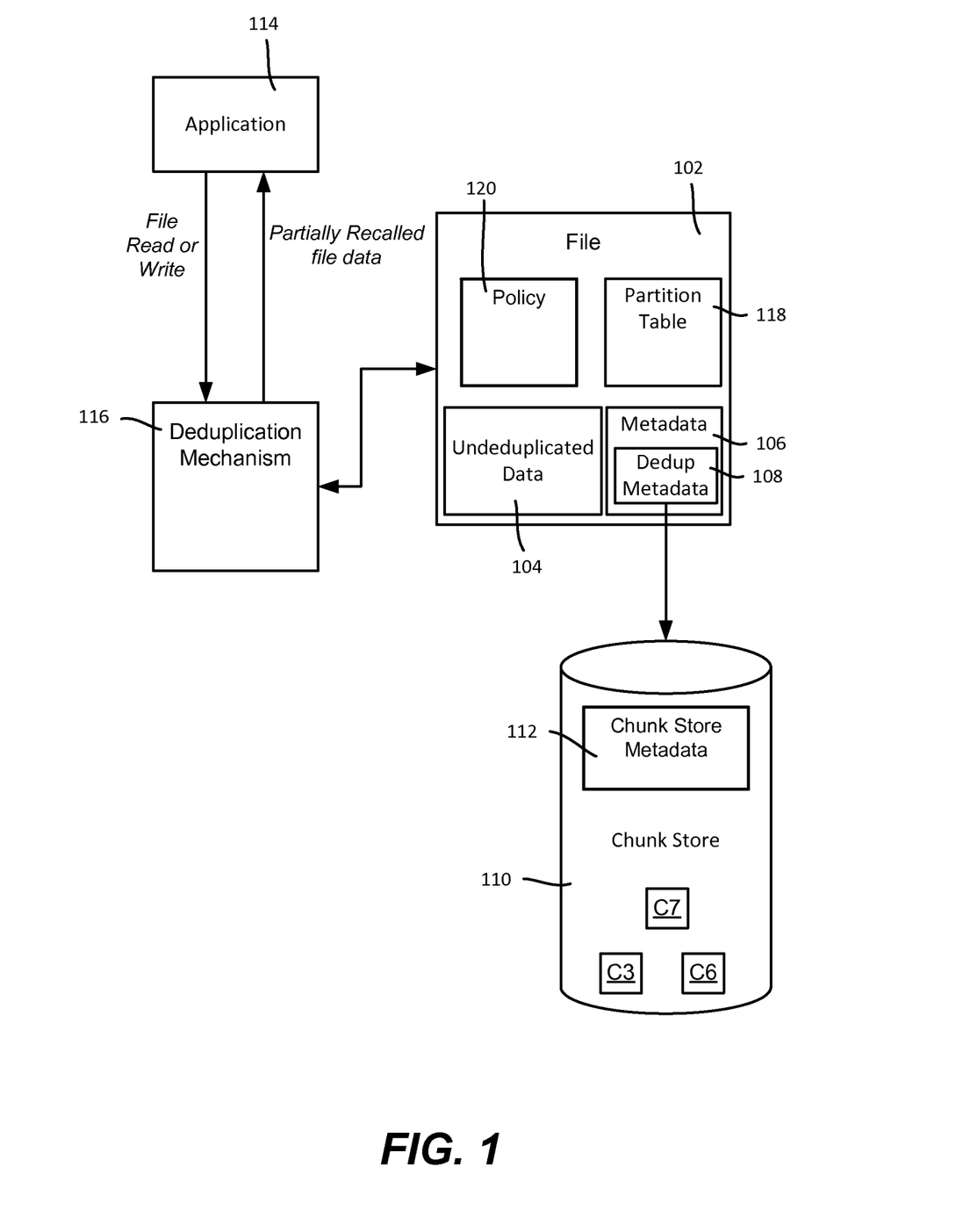
FIG. 1 is a block diagram illustrating an exemplary system for optimizing a partially deduplicated file according to one example implementation.

FIG. 1 is a block diagram illustrating an exemplary system for optimizing a partially deduplicated file according to one example implementation. The exemplary system may support various deduplication or optimization mechanisms for transforming the partially deduplicated file, such as a file 102, into a fully deduplicated file. In one exemplary implementation, the file 102 includes a combination of undeduplicated data 104 and deduplicated portions (i.e., chunks). The undeduplicated data 104 may include partially recalled data and/or data that has yet to be deduplicated. For example, the application 114 may modify the partially recalled data and/or add new data to the file 102.

In general, when a file is fully deduplicated, the file is associated with metadata 106 including deduplication (dedup) metadata 108 that maps the file's chunks (e.g., C3, C6 and C7) in the chunk store 110 back to a logical representation of the file. If the file 102 is partitioned into sub-file partitions during the deduplication process, the file 102 also includes a partition table 118 that maintains file offsets for each sub-file partition as well as file offsets for any partition within the sub-file partitions. As described herein, the partition table 118 may include a hierarchy of file ranges that correspond with the sub-file partitions.

Chunk store metadata 112 includes a hash index to ensure that the chunk store 110 does not store a duplicate chunk. In general, when an application 114 modifies existing data or writes new data to the file, a deduplication mechanism 116 (e.g., implemented in a file system filter) accesses one or more referenced chunks in the chunk store 110, returns the one or more referenced chunks as recalled file data, after any decompression as appropriate, and stores the recalled file data in the undeduplicated data 104.

There are various operations that cause the file 102 to change from being in a fully deduplicated state to a non-deduplicated/partially deduplicated state. This includes when a user or process writes to the file, such that the modified file data at the written file offset location no longer matches the chunk or chunks that had previously contained the data. Fully recalling the entire file to support such a file modification is often inefficient (e.g., for a small modification to a very large file).

Recalling only relevant chunks leaves the file 102 in a partially deduplicated state in which the file 102 includes some recalled file data as well as references to the chunks that have not been recalled. For example, in FIG. 1, consider that the application 114 recalls only chunk C7 and writes to its corresponding data. The file 102 contains the recalled chunk data in the undeduplicated data 104 as modified by a write operation. The deduplication metadata 108 is updated to reflect this partial recall state so as to know the file 102 contains the recalled data, and so as to no longer map to the now-outdated chunk C7.

In one exemplary implementation, the deduplication metadata 108 tracks which portion or portions of the file 102 have been recalled and which remain as deduplicated chunks in the chunk store 110. The file 102 thus may exist in a non-deduplicated state, a partially deduplicated (partial recalled) state, or a fully deduplicated (i.e., optimized) state. A file may be in a partially deduplicated state in a variety of scenarios. For example, a user may have modified some file ranges in-place. The deduplication mechanism 116 may also recall more data to align the user writes to chunk boundaries, sparse file boundaries (which, in one implementation, are fixed blocks of sixty-four (64) KB each) or any other boundaries. As another example, the deduplication mechanism 116 optimized a sub-file partition, truncated the associated file ranges and either had to stop during the deduplication process due to a pause instruction or because the system crashed. In yet another example, the deduplication mechanism 116 deduplicated a previous version of the file and then, the user extended the file with new data.

In one implementation, the deduplication mechanism 116 performs various tracking operations, including maintaining tracking data in the dedup metadata 108, as to which parts of the file 102 have been recalled and which remain in the chunk store 110. In one exemplary implementation, corresponding to a Microsoft® NTFS configuration, the tracking data is maintained in an NTFS reparse point, which also serves to notify the deduplication mechanism 116 that the file is partially deduplicated. Reparse points are well known in other usage scenarios, and are not described herein in detail. Note that a reparse point is only one alternative; other metadata/streams alternatively may be used for tracking purposes.

In one exemplary implementation, the deduplication mechanism 116 performs the deduplication process in accordance with a deduplication policy 120. Such a policy includes various criteria for determining when to start, stop and/or resume the deduplication process on the file 102. For example, the deduplication mechanism 116 may start the deduplication process when a period of time elapses after a modification to the file 102 or when a host machine becomes idle. As another example, the deduplication mechanism 116 may stop the deduplication process and commit the new chunks when the new chunks exceed a certain size or when the host machine becomes non-idle or need to shut down. As yet another example, the deduplication mechanism 116 may commit the new chunks to the chunk store 112 after completing the chunking of the undeduplicated data 104 or after completing the chunking one of the sub-file partitions.

Figure 2:
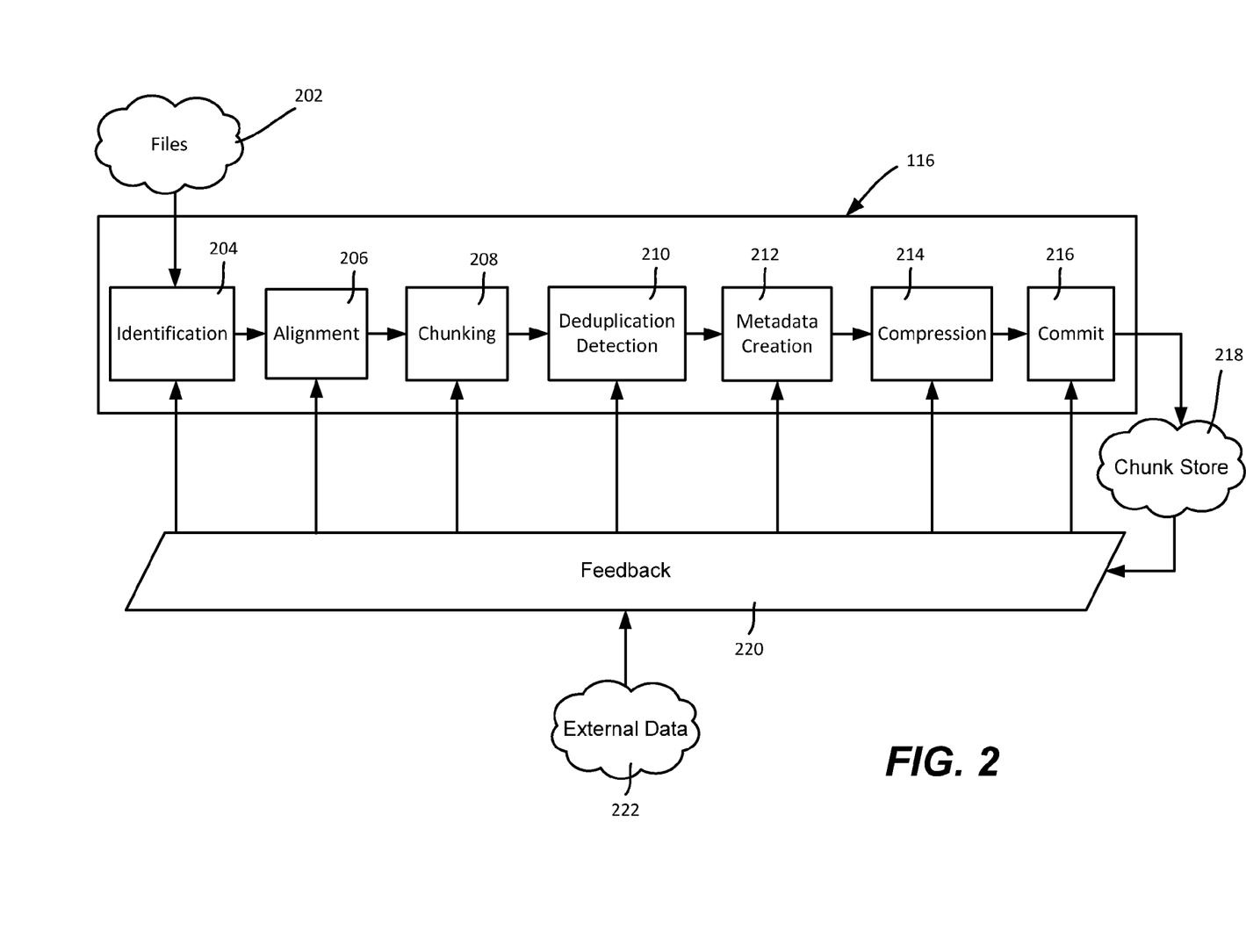
FIG. 2 is a block diagram representing example components/phases of a deduplication mechanism according to one example implementation.

FIG. 2 is a block diagram representing example components of the deduplication mechanism 116 according to one example implementation. In this example implementation, the example components operate as sequential phases during execution of a deduplication process on files 202.

The deduplication process transforms a partially deduplicated file or a non-deduplicated into a fully deduplicated file as described herein. This includes an identification phase 204 that scans the files 202 and determines which ones are partially deduplicated. In one exemplary implementation, the deduplication mechanism 116 examines various deduplication metadata and detects a file in partially recalled state. The deduplication metadata may include reparse data that points to one or more stream maps. If a combined size of the chunks in the chunk store is less than a file size or a file-range bitmap indicates one or more undeduplicated portions, then the file is in partially deduplicated state. Then, the deduplication mechanism 116 retrieves a stream map defining file ranges for deduplicated portions as well as the undeduplicated portions. Each portion may correspond with a starting file offset and a size from which the deduplication mechanism 116 computes an ending file offset. The file ranges do not overlap and cover the entirety of the file from start to end.

In one exemplary implementation, the deduplication mechanism 116 identifies chunks encompassing the file ranges of the undeduplicated portions. For example, an application may have recalled these chunks and modified one or more various portions to place the file in the partially recalled state. An alignment phase 206 modifies chunk boundaries associated with these chunks to prevent overlap between these new chunks and chunk boundaries associated with the deduplicated portions. The alignment phase 206 also directs a chunking component to commence a chunking phase 208 at a particular file offset and terminate the chunking phase 208 at another file offset as explained herein.

During the chunking phase 208, a chunking algorithm, such as $ChA_1$-$ChA_m$, may be selected depending on heuristics that may involve file attributes such as file extension, header information, and so forth. For example, a generic chunking algorithm may be selected for one file, whereas another file may have a chunking algorithm specific to its file extension (such as a chunking algorithm for ZIP parts). A chunking algorithm also may be selected based on hints from the identification phase 204 or based on internal feedback 220 or external feedback 222.

The chunking phase 208 (which may include or follow file decompression as needed in a given implementation) decomposes the file content into chunks according to a chosen algorithm that may increase the probability of each chunk's content to be duplicated in another file and then, these chunks may be compressed later. Chunking may be performed as according to the structure of the file, content-driven algorithms (e.g., partition a media file into a media header and media body which in turn can be hierarchically split in a sequence of parts), or by using an algorithm to chunk the file contents based on fast hashing techniques (such fast hash functions include CRC and Rabin families of functions) that is repeatedly computed on a sliding window, where a chunk is selected when the hash functions and the current chunk size/content meets certain criteria.

The result of the chunking phase 208 comprises a list of chunks (per file), which are passed using a set of "chunk records," each of which contains associated metadata describing the type of data in a chunk. One example of such metadata is any rolling hash computed as part of the execution of the chunking algorithms. Another example is an indicator of the compression level of the actual data within the chunk (for example, the ZIP chunking module will instruct the compression selector module not to compress chunks that are likely already compressed). Note that for hosted process execution, the chunks are inserted into an appropriate "output queue" for processing and then sent in batches to the deduplication process.

The chunks, which may be processed in batches, are consumed by the next phase, namely a deduplication detection phase 210 that uniquely identifies each chunk through hashing and then, uses the hash for deduplication detection. After chunking, the deduplication detection phase 210 determines whether the chunks already exist in the chunk store. A strong hash calculated for the chunk is computed to invoke a lookup operation in a hash index service. The hash index service indexes the hashes of some or all of the unique chunks that are already known to the deduplication system or already stored within the chunk store 218.

The chunk store 218 maintains a persistent database of the actual chunks. The chunking phase 208 supports inserting a new chunk into the chunk store 218 (if there is no such chunk yet), adding reference data to an existing chunk in the chunk store (upon detecting a previously persisted chunk), and committing a set of chunk inserts and/or chunk reference additions. The chunk store 218 also may implement various background/maintenance jobs, including garbage collection, data/metadata checking, and so forth.

A metadata creation phase 212 generates the deduplication metadata and chunk store metadata to account for the new chunks that are defined by the chunking phase 208. In exemplary implementations that maintain per-file chunk store metadata, such as a stream map, the deduplication mechanism 116 rebuilds such metadata by combining original chunk store metadata and new chunk metadata. In addition, the metadata creation phase 212 updates the deduplication metadata to map to the chunk store metadata that is associated with the new chunks.

In one exemplary implementation, the deduplication mechanism 116 retains unchanged chunk definitions from an old stream map and adds these definitions to a new stream map. For new chunks that correspond to the aligned undeduplicated portions, the deduplication mechanism 116 adds corresponding definitions to the new stream-map and subsequently, skips any obsolete definitions of the old stream map. Essentially, the new stream-map is created by stitching the old stream map and the new chunk metadata. The deduplication mechanism 116 adds the new stream map to the chunk store metadata and deletes the old stream map. Alternatively, the deduplication mechanism 116 updates the old stream map with the new chunk metadata rather creating a new stream map and deleting the old stream map.

In another exemplary implementation, the deduplication metadata may include a partition table comprising a hierarchy of file ranges associated with the chunks and the sub-file partitions. This hierarchy may directly map to a set of sub-file partitions. One example comprises a top-level stream map pointing to a set of second-level stream maps. Another example includes a multi-level organization of stream maps. Another example includes using predefined, fixed size sub-file partitions, which enables the translation between a file offset to a particular sub-file partition by dividing the file offset with the fixed sub-file partition size without consulting a top-level stream map.

In another exemplary implementation, the deduplication mechanism 116 uses reference counts instead of a stream map as part of the metadata. The deduplication mechanism 116 decrements a reference count for any chunk that is no longer referenced by a given file and increments a reference count for any newly referenced chunk that corresponds with the aligned undeduplicated portions.

When transitioning from one stage to the next in the same deduplication process, the deduplication mechanism 116 may add new chunk definitions to an original stream map instead of creating a new stream map as described herein. In one exemplary implementation, the deduplication mechanism 116 appends the new chunk definitions to the original stream map of the file. In another exemplary implementation, the deduplication mechanism 116 splits the original stream map into a series of partial stream maps where each corresponds to a sub-file partition being processed during a commit phase 216.

If the deduplication process handles a pause instruction while optimizing a sub-file partition, the deduplication mechanism 116 creates a new stream map that includes the new chunk metadata as well as definitions associated with the deduplicated portions. When the chunking phase 208 resumes chunking the undeduplicated portions, the new stream map supersedes the original stream map. During the commit phase 216, the reparse data now references the new stream map permitted the original stream map to be reclaimed.

If the file is in a partially recalled state and the deduplication process is paused, the new stream map created after the resume instruction does not supersede the original stream map. In one exemplary implementation, the partially recalled file references both stream maps. In another exemplary implementation, the partially recalled file continues referencing only the old stream map. The deduplication mechanism 116 avoids file truncation during the commit phase 216. When the last sub-file partition is deduplicated, the new stream map supersedes the original stream map.

Before adding the new chunks to the chunk store 218, these new chunks may be processed with respect to a compression phase 214. A compression algorithm selector processes the file and the chunk metadata and may try to determine which compression algorithm $CA_1$-$CA_n$ (if any) works best for this type of data. After any compression is performed, the runtime may verify whether any substantial savings were made. For example if a compressed chunk is larger than its uncompressed form, the new chunks are stored uncompressed (or compression may again be attempted with a different algorithm). The compression algorithm may be selected based on policy, file type, and so forth.

A commit phase 216 replaces each file with references pointing to the deduplicated data within the chunk store 218. To this end, the deduplication mechanism 116 receives a list of files whose chunks are already inserted in the chunk store. In one implementation, each chunk list is encapsulated in a chunk ID stream (identified by a unique Stream ID), which is persisted into a reparse point associated with the file. During the commit phase 216, the deduplication mechanism 116 replaces the file with tracking data, such as a reparse point, containing the ID and locator of the chunk stream ID, that is, the chunk containing the stream map, comprising the list of chunks used to assemble the current file and their logical offsets.

Figure 3A:
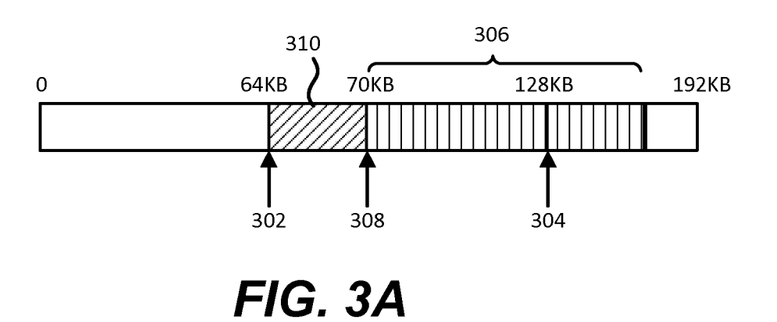
FIG. 3A-FIG. 3B illustrate various exemplary partially recalled files that are transformed into a fully deduplicated file according to one example implementation.
Figure 3B:
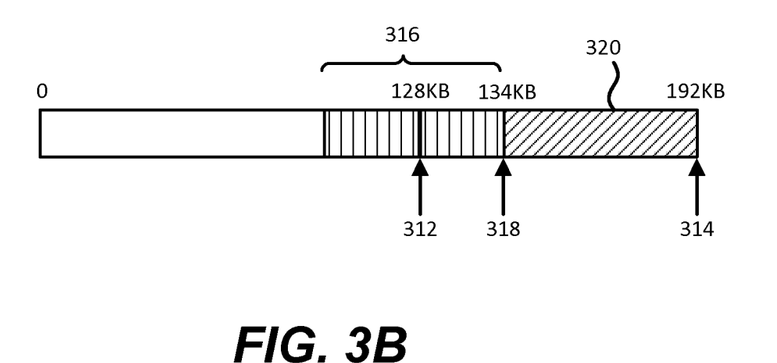
Figure 3C:
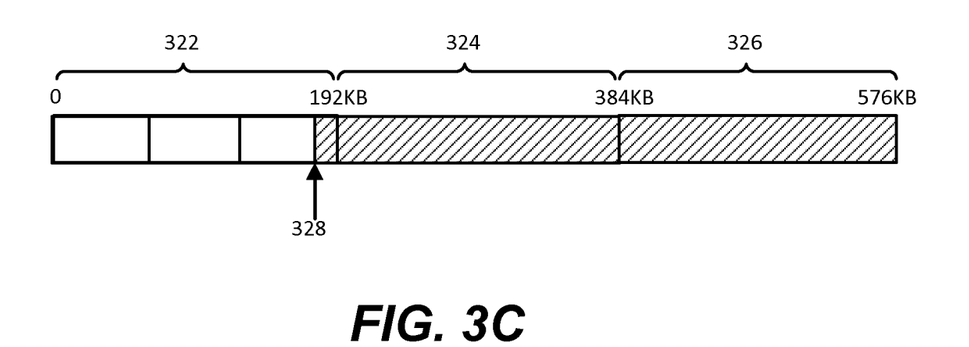
FIG. 3C illustrates an exemplary partially deduplicated file that is transformed into a fully deduplicated file according to one example implementation.

FIG. 3A-FIG. 3C illustrate various example files that include at least one undeduplicated portion transformed into fully deduplicated files according to some exemplary implementations.

FIG. 3A illustrates a partially recalled file having a chunk that starts at file offset 302, ends at file offset 304 and includes an undeduplicated portion 306 starting at file offset 308. Each chunk is equally sized at sixty-four (64) KB, but other chunk sizes are within the scope of the present disclosure. In one exemplary implementation, the deduplication mechanism 116 commences a chunking phase at the file offset 302. In another exemplary implementation, the deduplication mechanism 116 commences the chunking phase at the file offset 308, which defines a new chunk 310 that is smaller than sixty-four (64) KB. The deduplication mechanism 116 modifies chunk boundaries of new chunks to align with a chunk boundary associated with a previous deduplicated portion.

FIG. 3B illustrates the partially recalled file having a chunk that starts at file offset 312, ends at file offset 312 and includes the undeduplicated portion 316 that ends at file offset 318. In one exemplary implementation, the deduplication mechanism 116 terminates the chunking phase at the file offset 318, which defines a new chunk 316 that is smaller than sixty-four (64) KB. In another exemplary implementation, the deduplication mechanism 116 terminates the chunking phase at the file offset 314 such that the new chunks align with a chunk boundary associated with a subsequent deduplicated portion. The deduplicated mechanism 116 may continue the chunking phase beyond the file offset 314 until alignment with a chunk having the subsequent deduplicated portion, according to another implementation.

In yet another exemplary implementation, the deduplicated mechanism 116 continues the chunking phase beyond the file offset 314 but uses a threshold value to determine when to terminate the chunking phase. If alignment with a chunk having the subsequent deduplicated portion is not achieved within the threshold value, the deduplication mechanism 116 defines a new chunk, similar to the chunk 320, which is smaller than sixty-four (64) KB and results in the required alignment. In one exemplary implementation, the deduplication mechanism computes the threshold value based on a fixed chunk size (e.g., sixty-four (64) KB to one hundred and twenty-eight (128) KB) or a total number of chunks.

FIG. 3C illustrates a partially deduplicated file that is partitioned into a sub-file partition 322, a sub-file partition 324 and a sub-file partition 326. The deduplication metadata maintains file offsets for these sub-file partitions. Deduplicating the partially deduplicated file is performed in stages where each sub-file partition is chunked and committed to a chunk store in a separate stage. Then, the deduplication mechanism updates the deduplication metadata and truncates the partially deduplicated file to avoid retaining two copies of a particular sub-file partition. After every stage, an undeduplicated portion reduces in size. The partially deduplicated file is transformed into a fully deduplicated file when a last sub-file partition is committed.

In one exemplary implementation, the deduplication mechanism 116 processes a pause instruction while deduplicating the sub-file partition 322 and stops the deduplication process at file offset 328. When a resume instruction is received, the deduplication mechanism 116 restarts the deduplication process at the file offset 328. After committing chunks forming the sub-file partition 322 to the chunk store and updating the metadata, the deduplication mechanism 116 deletes the sub-file partition 322 and proceeds to deduplicate the sub-file partition 324. As described herein, once the sub-file partition 324 is deduplicated, the deduplication process terminates because there are no more undeduplicated portions remaining.

Figure 4A:
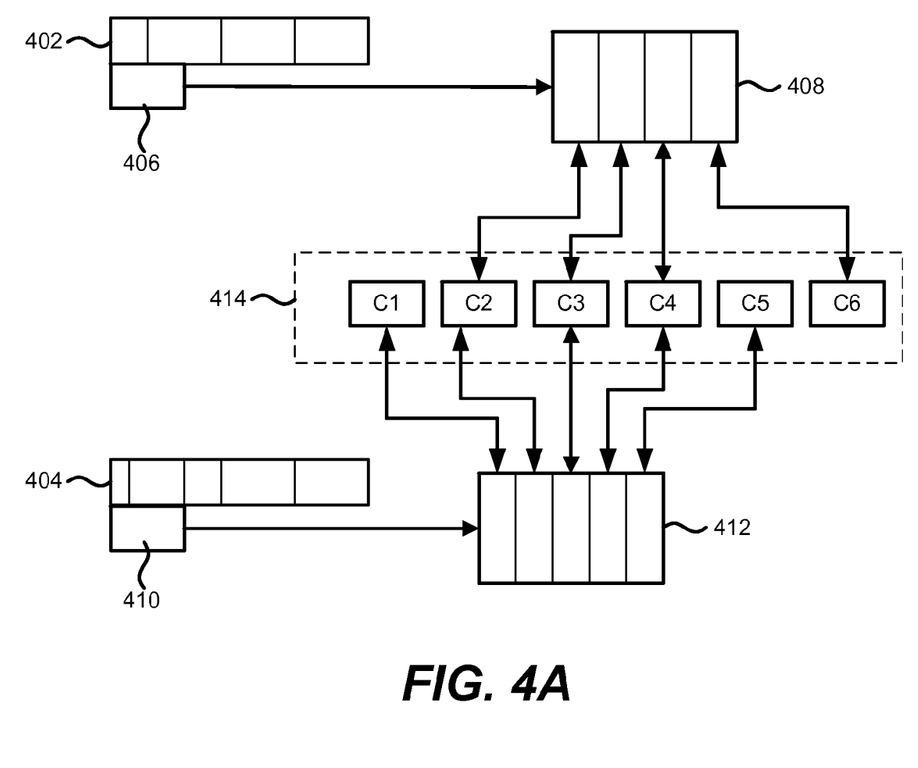
FIG. 4A-FIG. 4B illustrate deduplication metadata according to one example implementation.

FIG. 4A-FIG. 4B illustrates deduplication metadata according to one example implementation. In one exemplary implementation represented in FIG. 4A, the deduplication metadata includes a file 402 and a file 404. The file 402 includes tracking data 406 that references a stream map 408. Similarly, the file 404 includes tracking data 410 that references a stream map 412. Both of the stream maps correspond with chunks within a chunk store 414. As illustrated, the stream map 408 defines chunks C2-C4 and chunk C6, which form the file 402. Similarly, the stream map 412 defines chunks C1-C5, which form the file 404.

If a particular chunk, such as chunk C5, is recalled and a portion is subsequently modified (undeduplicated) by an application causing the file 404 to become a partially deduplicated file, the deduplication mechanism 116 defines one or more new chunks encompassing the chunk C5. Then, the deduplication mechanism 116 updates the stream map 412 or creates a new stream map to replace the stream map 412. In either implementation, the deduplication metadata now maps to the one or more new chunks instead of the chunk C5. For example, if the deduplication mechanism 116 creates a new chunk that matches chunk C6, the updated or new stream map includes a new definition that maps to the chunk C6 in the chunk store 414.

Figure 4B:
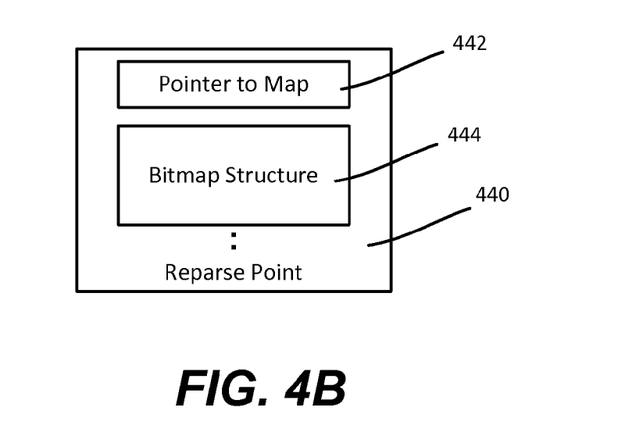

In one implementation generally represented in FIG. 4B, an NTFS reparse point 440 includes a pointer 442 for referencing a stream map and a bitmap structure 444 for tracking chunks having undeduplicated portions. The reparse point 440 may be an embodiment of the tracking data 406 or the tracking data 410. More particularly, in order to partially recall the file, the deduplication mechanism 116 creates a virtual view of the file, with the chunking phase performed at a pre-determined boundary, such as at a sixty-four (64) KB boundary. The deduplication mechanism 116 maintains this view in the bitmap structure 444 in the reparse point 440 in which, in one implementation, a set bit in the bitmap structure 444 indicates that a chunk has been recalled to the deduplicated file, whereas a zero bit indicates that the chunk resides in the chunk store. The size of the chunk can be added while setting the reparse point 440.

Note that the data is recalled at one time and the bitmap structure 444 is updated at another time, which leads to possible crash-related inconsistency. As described herein, when committing (e.g., flushing) the data to stable storage (e.g., disk or the like), the ordering of operations makes the system crash consistent. More particularly, a change to the bitmap structure 444 is only flushed to disk after the corresponding data that it represents has been flushed to disk. In this way, the bitmap structure 444 never indicates that the data has been partially recalled until that data is known to be safely flushed to disk. Note that if a disk and file system support write-through, write-through may be used instead of flush. Note that while flushing file data/metadata to disk is typically used as an example herein, this is only an example. Thus, "committing to stable storage" also includes the concept of file system and storage media write-through as well as the concept of using file system and storage media flushing or any other means to ensure that data is written securely to stable storage.

In one exemplary implementation, the bitmap structure 444 may be used to efficiently convert a partially recalled file back to a fully deduplicated file. To this end, when a file is being scanned for deduplication, the tracking data may be used such that only the partially recalled file ranges (i.e., undeduplicated portions) are provided to the deduplication mechanism 116 for deduplication. As new chunks comprising these partially recalled file ranges are added to the chunk store, the deduplication metadata including the reparse point 440 is adjusted to reflect that the partially recalled file ranges are now optimized chunks and no longer partially recalled ranges.

Figure 5:
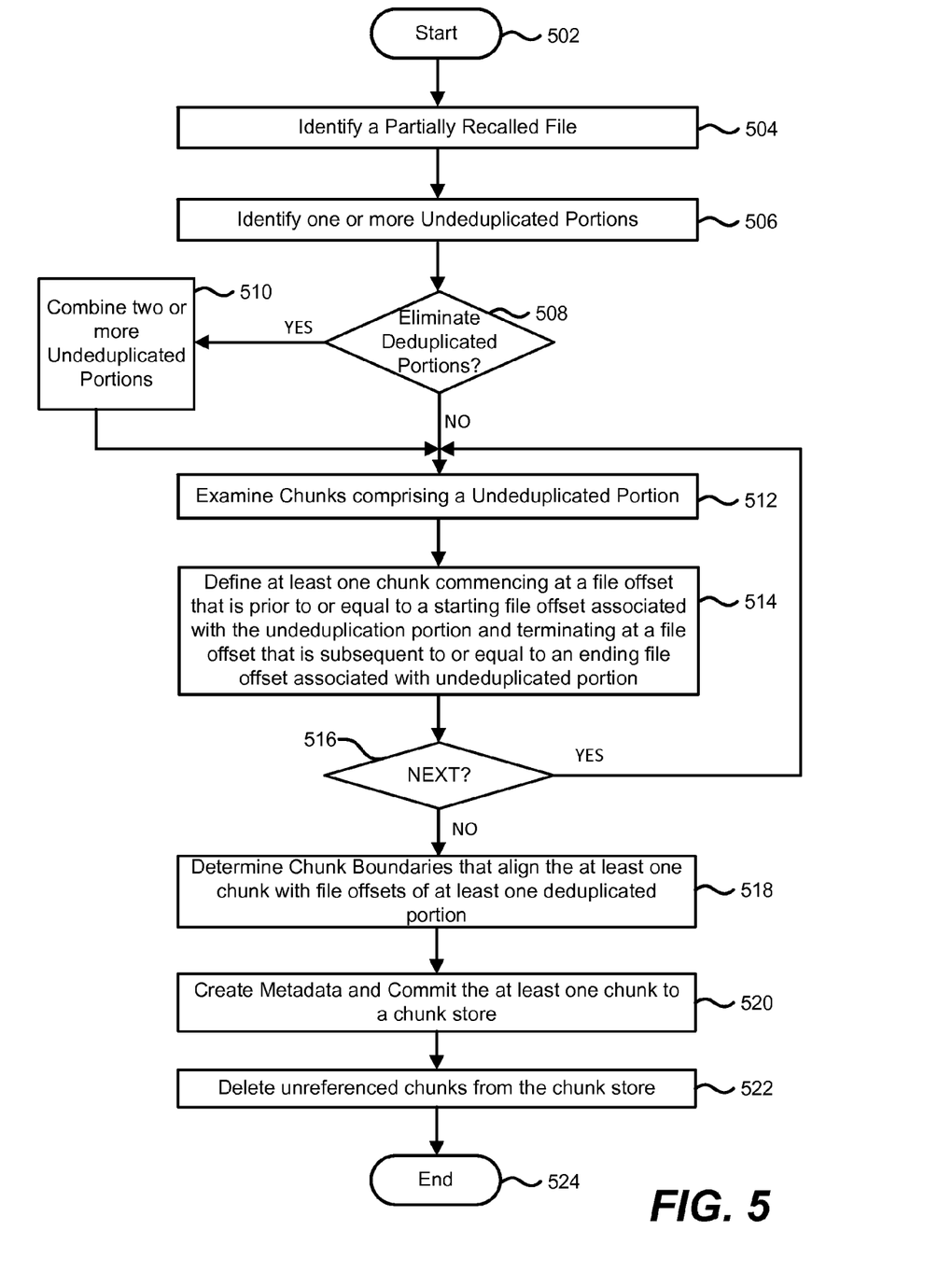
FIG. 5 is a flow diagram illustrating steps for transforming a file having at least one undeduplicated portion into a fully deduplicated file according to one example implementation.

FIG. 5 is a flow diagram illustrating steps for transforming a file having at least one undeduplicated portion into a fully deduplicated file according to one example implementation. Steps depicted in FIG. 5 commence at step 502 and proceed to step 504 when the deduplication mechanism 116 identifies a partially recalled file, which is partitioned into chunks. Step 506 illustrates identification of one or more undeduplicated portions using metadata associated with the file, such as deduplication metadata and chunk store metadata. As described herein, the deduplication mechanism 116 may examine recall bitmaps within a reparse point and determine recalled file ranges as well as locations of chunks that encompass these file ranges, according to one exemplary implementation.

Step 508 represents a decision as to whether to eliminate chunk boundaries for any deduplicated portion. In one exemplary implementation, because the undeduplicated portions need to be aligned with chunk boundaries of chunks comprising the deduplicated portions, a small deduplicated portion between two undeduplicated portions causes a small chunk to be defined during the chunking phase. If the partially recalled file includes the small deduplicated portion, the method described in FIG. 5 proceeds to step 510. If, on the other hand, there are no deduplicated portions to be eliminated, the method described in FIG. 5 proceeds to step 512.

Step 510 is directed to combining the two or more undeduplicated portions into one undeduplicated portion that is deduplicated as a single file range of recalled data, which may require a chunk to be read from the chunk store to fill the gap between the undeduplicated portions. After performing step 510, the method described in FIG. 5 proceeds to step 512.

Step 512 is directed to examining a undeduplicated portion. In one exemplary implementation, the deduplication mechanism 116 identifies chunks chunks comprising or encompassing the undeduplicated portion. In one exemplary implementation, the deduplication mechanism 116 identifies a first or earliest undeduplicated portion within the file and defines new chunks that align with chunk boundaries of surrounding chunks within at least one deduplicated portion. Step 514 represents the definition of at least one chunk commencing at a file offset that is prior to or equal to a starting file offset associated with the undeduplicated portion and terminating at a file offset that is subsequent to or equal to an ending file offset associated with the undeduplicated portion.

Step 516 is directed to a decision as to whether to deduplicate a next undeduplicated portion of the partially recalled file. If there are no more undeduplicated portions, the method described in FIG. 5 proceeds to step 518. If, on the other hand, there are additional undeduplicated portions, the method described in FIG. 5 returns to step 512. Step 518 illustrates the determination of chunk boundaries that align with file offsets of the at least one deduplicated portion of the partially recalled file. In one exemplary implementation, a last chunk of the at least one chunk has a chunk boundary that does not overlap a chunk boundary of a succeeding chunk of the at least one deduplicated portion. Similarly, a first chunk of the at least one chunk has a chunk boundary that does not overlap a chunk boundary of a preceding chunk of the at least one deduplicated portion.

Step 520 refers to creating metadata for the at least one chunk and committing the at least one chunk to a chunk store. In one exemplary implementation, the deduplication mechanism 116 creates mappings between file offsets of the partially recalled file and the chunk boundaries of the at least one chunk. Then, the deduplication mechanism 116 combines these mappings with the chunk boundaries of the at least one deduplicated portion and creates chunk store metadata, which replaces previous chunk store metadata for the file. In alternative implementation, the deduplication mechanism 116 updates deduplication metadata (e.g., reparse point, stream id, bitmap and/or the like) and the chunk store metadata (e.g., a stream map) using with these mappings. Prior to storing the at least one chunk, the deduplication mechanism 116 examines a hash index associated with the chunk store to determine whether any of the chunks are already stored in the chunk store.

In another alternative implementation, the deduplication mechanism 116 performs step 518 and Step 520 prior to chunking the next deduplicated portion. For example, before performing step 516, the deduplication mechanism 116 halts the deduplication process, updates the chunk store metadata with the chunk boundaries, commits the at least one chunk to the chunk store and truncates the partially recalled file by deleting the undeduplicated portion. The deduplication mechanism 116 may halt the deduplication process in response to a pause instruction as depicted in FIG. 6.

In yet another alternative implementation, the deduplication mechanism 116 halts the deduplication process based on a deduplication policy. As an example, the deduplication mechanism 116 uses various criteria to commit the at least one chunk associated with the undeduplicated portion before identifying the next undeduplicated portion and defining at least one chunk with such a portion.

Step 522 is directed to deleting unreferenced chunks from the chunk store. For example, these chunks are no longer associated with a stream map for any file including the partially recalled file. For implementations that employ reference counts, the deduplication mechanism decrements a reference count for the at least one chunk. If any resulting reference count is equal to zero, each corresponding chunk is reclaimed and deleted. Step 524 terminates the steps of the method described by FIG. 5.

Figure 6:
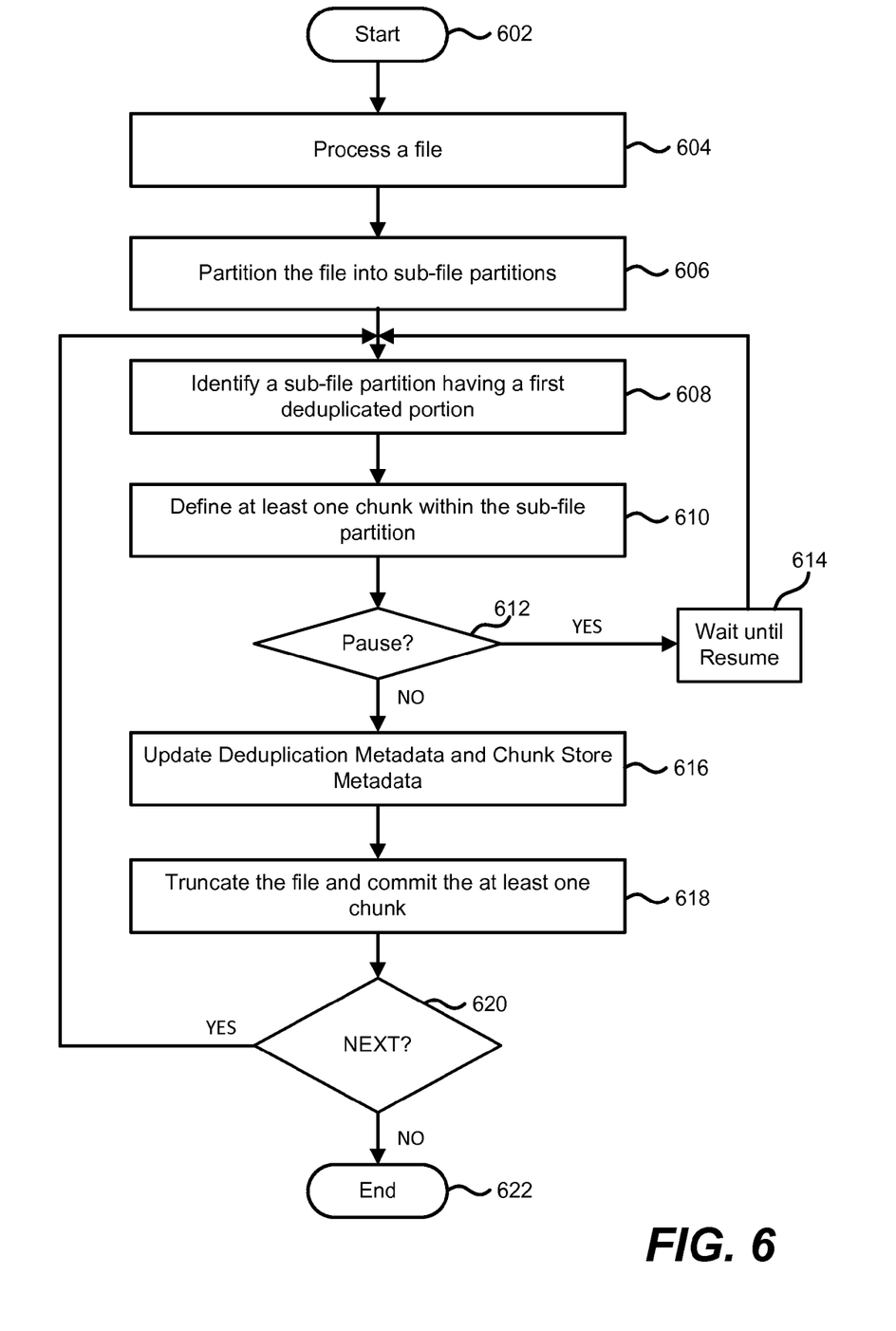
FIG. 6 is a flow diagram illustrating steps for deduplicating a file that is partitioned into sub-file partitions according to one example implementation.

FIG. 6 is a flow diagram illustrating steps for deduplicating a file that is partitioned into sub-file partitions according to one example implementation. Steps depicted in FIG. 6 commence at step 602 and proceed to step 604 when the deduplication mechanism 116 processes a file. Step 606 is directed to partitioning the file into sub-file partitions. In one exemplary implementation, deduplicating the file all at once requires a significant amount of time. Therefore, the deduplication mechanism 116 divides the file into the sub-file partitions of equal size, which are deduplicated one at a time instead of altogether.

Step 608 is directed to identifying a sub-file partition having a first deduplicated portion. If the file is completely undeduplicated, then a deduplication process commences at a first sub-file partition. If the file is partially deduplicated, then the deduplication process commences at a starting offset associated with the first sub-file partition that includes an undeduplicated portion. As explained herein, if the deduplication process was paused before completing a sub-file partition, then the deduplication process restarts at the starting offset associated with the first undeduplicated portion because that is where the deduplication process stopped. Furthermore, a chunk preceding the first undeduplicated portion was the last chunk committed to the chunk store.

Step 610 is directed to defining at least one chunk with the sub-file partition. Step 612 refers to a determination as to whether the deduplication mechanism 116 receives a pause instruction that halts chunking of the first undeduplicated portion. According to an alternative implementation, a system crash causes the deduplication process to effectively pause in a similar fashion. If the deduplication mechanism 116 pauses, the method described in FIG. 6 proceeds to step 614. Step 614 is directed to waiting until the deduplication process resumes the chunking of the first undeduplicated portion. In one exemplary implementation, the deduplication mechanism 116 receives an instruction from a file system and restarts the definition of the at least one at the starting offset of the first undeduplicated portion. If, on the other hand, the deduplication mechanism 116 does not pause during the deduplication process, the method described in FIG. 6 proceeds to step 616.

Step 616 is directed to updating deduplication metadata and chunk store metadata. In one exemplary implementation, the deduplication mechanism 116 updates mappings in a stream map with new chunk definitions. In another exemplary implementation, the deduplication mechanism 116 creates a new stream map using original mappings to previously deduplicated chunks and new mappings associated with the new chunk definitions.

Step 618 is directed to truncating the file and committing the at least one chunk to the chunk store. The sub-file partition comprising the first undeduplicated portion is removed from the file because a copy of the corresponding file data is stored in the chunk store. Step 620 is directed to a determination as to whether to deduplicate a next sub-file partition. If there are no more sub-file partitions in the file, the method described in FIG. 6 proceeds to step 622. If, on the other hand, there are additional sub-file partitions, the method described in FIG. 6 returns to step 608. Step 622 terminates the steps of the method described by FIG. 6.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
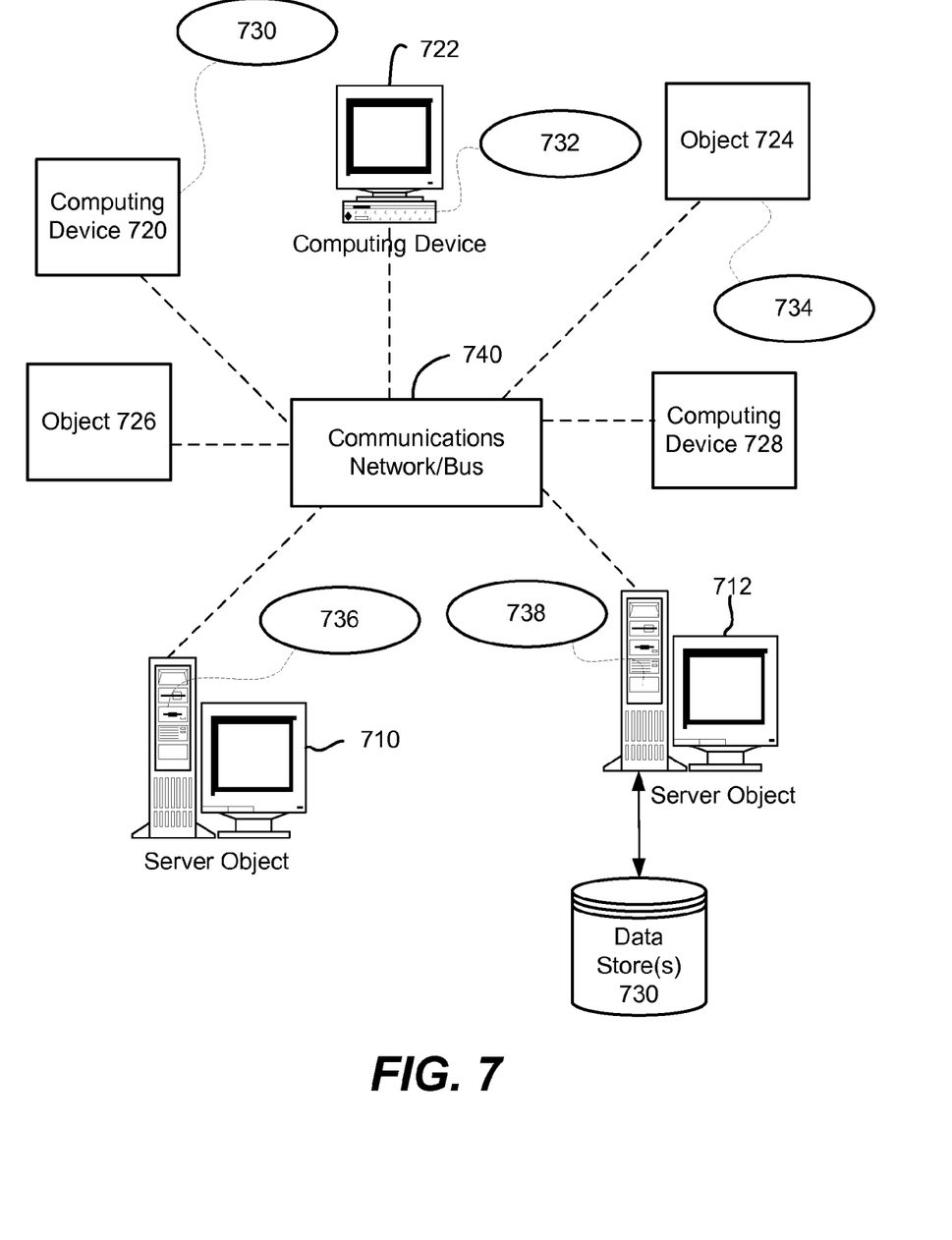
FIG. 7 is a block diagram representing exemplary non-limiting networked environments in which various embodiments described herein can be implemented.

FIG. 7 provides a schematic diagram of an exemplary networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
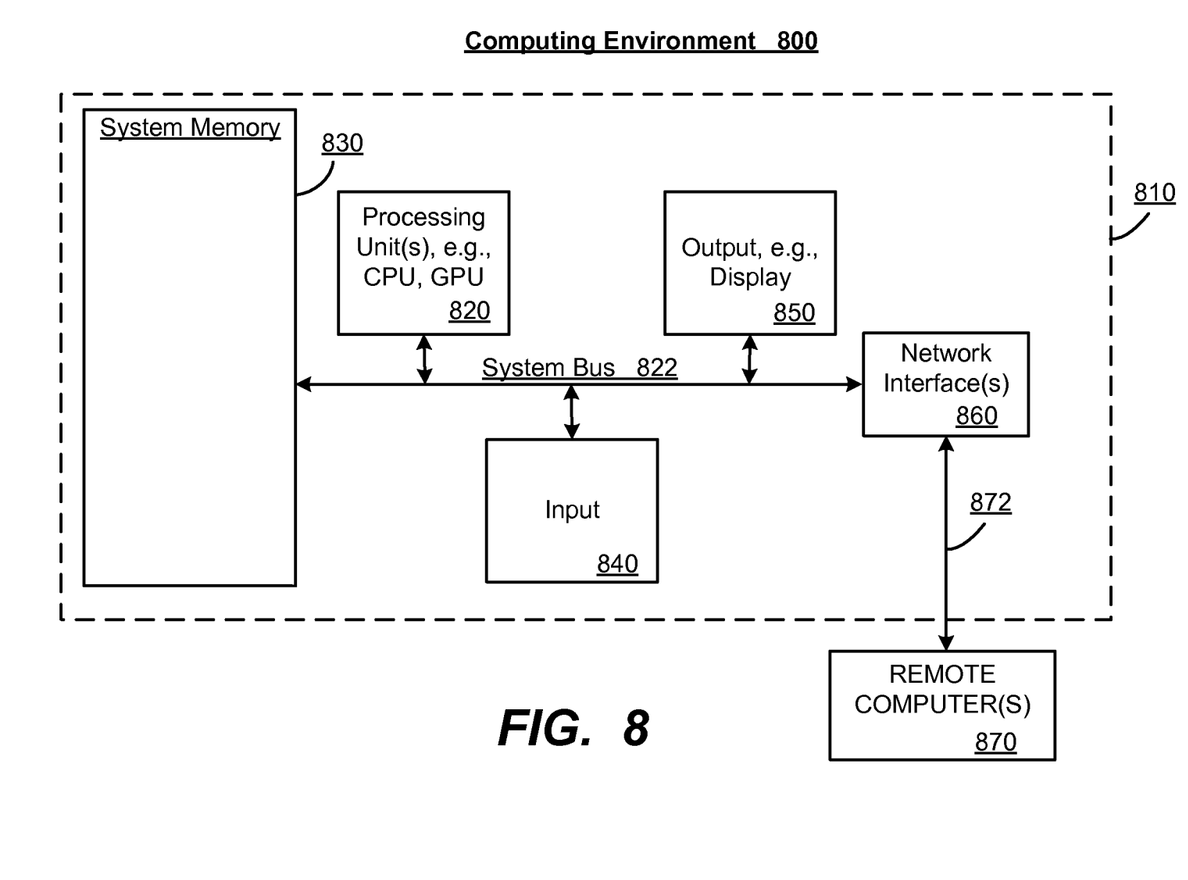
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising, re-optimizing a partially deduplicated file having at least one undeduplicated portion-into a fully deduplicated file, in which the partially deduplicated file further has at least one deduplicated portion that is maintained in a chunk store and is referenced by metadata associated with the partially deduplicated file, the re-optimizing including processing each undeduplicated portion of the file to determine at least one chunk, committing the at least one chunk to a chunk store, and modifying metadata associated with the file to include a reference to each chunk that is committed to the chunk store.

2. The method of claim 1 further comprising recalling a deduplicated portion from the chunk store, and combining two undeduplicated portions of the file that are separated by the deduplicated portion that is recalled into a single undeduplicated portion that includes each undeduplicated portion and the deduplicated portion, before processing that single undeduplicated portion.

3. The method of claim 1 wherein processing at least one undeduplicated portion comprises defining a chunk starting from a file offset that is prior to or equal to a starting file offset associated with that undeduplicated portion.

4. The method of claim 3 further comprising, determining the file offset by aligning with a last chunk fully contained in a preceding deduplicated portion.

5. The method of claim 1 wherein processing at least one undeduplicated portion comprises defining a chunk by ending chunking of that portion at a file offset that is subsequent to or equal to an ending file offset associated with that undeduplicated portion.

6. The method of claim 5 further comprising determining the ending file offset based upon where the chunking of the undeduplicated portion aligns with one or more existing chunks associated with a preceding deduplicated portion.

7. The method of claim 5 wherein chunking continues beyond the end of that undeduplicated portion, and further comprising, determining whether chunk alignment is achieved within a size-based threshold or chunk number-based threshold, and if alignment is not achieved within the threshold, stopping chunking.

8. The method of claim 1, further comprising, partitioning the file into a plurality of sub-file partitions, and wherein re-optimizing the file comprises separately processing each sub-file partition.

9. The method of claim 1 wherein modifying the metadata occurs in conjunction with committing at least one re-optimized chunk, and wherein modifying the metadata includes combining chunk definitions of deduplicated portions with chunk definitions of the at least one re-optimized chunk.

10. The method of claim 1 further comprising pausing, and subsequently resuming, the re-optimizing of the file.

11. The method of claim 10 further comprising, committing at least one chunk to the chunk store before pausing.

12. The method of claim 11 wherein committing the at least one chunk to the chunk store and pausing occurs based upon one or more criteria, the criteria including file size, when a machine performing the re-optimization becomes non idle, or when the machine is going to be shutdown.

13. The method of claim 11, further comprising, maintaining metadata that tracks which portion of the file is deduplicated, and truncating the portion of the file that is deduplicated.

14. The method of claim 1 wherein the chunks are committed to a chunk store, and further comprising, garbage collecting at least one chunk from the chunk store that is no longer referenced as a result of re-optimizing the file.

15. In a computing environment, a system comprising, at least one processor, a memory communicatively coupled to the at least one processor and including components comprising, a deduplication mechanism configured to re-optimize a partially deduplicated file having at least one undeduplicated portion into a fully deduplicated file, in which the partially deduplicated file further has at least one deduplicated portion that is maintained in a chunk store and is referenced by metadata associated with the partially deduplicated file, the deduplication mechanism configured to chunk each undeduplicated portion into at least one re-optimized chunk, to commit at least one re-optimized chunk into the chunk store, and to modify the metadata to reference each chunk of the file that is committed to the chunk store.

16. The system of claim 15, wherein the deduplication mechanism partitions the file into sub-file partitions, commits each re-optimized chunk of each sub-file partition before beginning re-optimizing of a next sub-file partition or when the last sub-file partition has been re-optimized, and truncates the file based upon which sub-file partition has been re-optimized.

17. The system of claim 15 wherein the deduplication mechanism commits the at least one re-optimized chunk into the chunk store prior to fully re-optimizing the file based upon a pause instruction.

18. The system of claim 17, wherein the deduplication mechanism resumes re-optimizing the file after the pause instruction based upon a resume instruction.

19. One or more computer-readable storage media having computer-executable instructions, which when executed perform steps, comprising: defining a chunk for an undeduplicated portion of a partially deduplicated file, in which the partially deduplicated file further has at least one deduplicated portion that is maintained in a chunk store and is referenced by metadata associated with the partially deduplicated file; aligning chunk boundaries of the chunk with file offsets associated with at least one deduplicated portion of the file; updating the metadata associated with the file based upon the chunk boundaries; and committing the chunk to a chunk store.

20. The one or more computer-readable storage media of claim 19 having further computer-executable instructions comprising, combining two undeduplicated portions of the file that are separated by a deduplicated portion into a single undeduplicated portion that includes each undeduplicated portion and the deduplicated portion.

* * * * *